United States Patent
Spangler et al.

(10) Patent No.: US 10,012,106 B2
(45) Date of Patent: Jul. 3, 2018

(54) ENCLOSED BAFFLE FOR A TURBINE ENGINE COMPONENT

(71) Applicant: United Technologies Corporation, Hartford, CT (US)

(72) Inventors: Brandon W. Spangler, Vernon, CT (US); Gina Cavallo, Watertown, CT (US)

(73) Assignee: United Technologies Corporation, Farmington, CT (US)

( * ) Notice: Subject to any disclaimer, the term of this patent is extended or adjusted under 35 U.S.C. 154(b) by 452 days.

(21) Appl. No.: 14/613,093

(22) Filed: Feb. 3, 2015

(65) Prior Publication Data
US 2015/0285096 A1 Oct. 8, 2015

Related U.S. Application Data

(60) Provisional application No. 61/974,688, filed on Apr. 3, 2014.

(51) Int. Cl.
| | |
|---|---|
| F01D 5/14 | (2006.01) |
| F01D 25/12 | (2006.01) |
| F01D 9/02 | (2006.01) |
| F01D 5/18 | (2006.01) |
| F01D 9/04 | (2006.01) |

(52) U.S. Cl.
CPC ............ *F01D 25/12* (2013.01); *F01D 5/188* (2013.01); *F01D 5/189* (2013.01); *F01D 9/02* (2013.01); *F01D 9/041* (2013.01); *F05D 2220/30* (2013.01); *F05D 2240/12* (2013.01); *F05D 2240/126* (2013.01); *F05D 2260/221* (2013.01); *Y02T 50/676* (2013.01)

(58) Field of Classification Search
CPC .... F01D 5/188; F01D 5/189; F01D 2240/126; F01D 2260/221
See application file for complete search history.

(56) References Cited

U.S. PATENT DOCUMENTS

| | | | |
|---|---|---|---|
| 3,799,696 A | * | 3/1974 | Redman ................. F01D 5/189 415/115 |
| 4,040,767 A | | 8/1977 | Dierberger et al. |

(Continued)

FOREIGN PATENT DOCUMENTS

| | | |
|---|---|---|
| EP | 2620592 | 7/2013 |

OTHER PUBLICATIONS

EP search report for EP15154027.5 dated Aug. 25, 2015.

*Primary Examiner* — Umashankar Venkatesan
(74) *Attorney, Agent, or Firm* — O'Shea Getz P.C.

(57) ABSTRACT

A turbine engine component includes an internal baffle spaced between first and second walls. Each wall may have a plurality of cooling holes in fluid communication with respective upstream and downstream cooling paths defined between the baffle and the respective walls. Cooling air first flows through an upstream end portion of the upstream cooling path, then through a downstream end portion where the air enters a bleed aperture in the baffle. From the bleed aperture, a portion of or all of the cooling air may enter an internal cavity defined by the baffle and, from there, flows through at least one hole that may be a plurality of impingement holes in the baffle, and into the downstream cooling passage where the portion or all of the remaining cooling air may exit the component through the cooling holes in the second wall.

17 Claims, 4 Drawing Sheets

(56) References Cited

U.S. PATENT DOCUMENTS

| | | | |
|---|---|---|---|
| 4,257,734 A * | 3/1981 | Guy | F01D 9/041 |
| | | | 415/115 |
| 4,767,261 A | 8/1988 | Godfrey et al. | |
| 4,775,296 A | 10/1988 | Schwarzmann et al. | |
| 4,798,515 A | 1/1989 | Hsia et al. | |
| 5,207,556 A | 5/1993 | Frederick et al. | |
| 5,577,889 A * | 11/1996 | Terazaki | F01D 5/186 |
| | | | 415/115 |
| 5,772,398 A * | 6/1998 | Noiret | F01D 5/189 |
| | | | 415/115 |
| 6,406,260 B1 * | 6/2002 | Trindade | F01D 5/187 |
| | | | 415/115 |
| 7,600,966 B2 | 10/2009 | Devore et al. | |
| 7,789,625 B2 * | 9/2010 | Liang | F01D 5/186 |
| | | | 415/115 |
| 8,079,815 B2 * | 12/2011 | Hada | F01D 5/188 |
| | | | 416/97 R |
| 8,109,724 B2 | 2/2012 | Malecki et al. | |
| 8,152,468 B2 | 4/2012 | Propheter-Hinckley et al. | |
| 8,348,613 B2 | 1/2013 | Gregg et al. | |
| 8,480,366 B2 | 7/2013 | Malecki et al. | |
| 2009/0245999 A1 | 10/2009 | Flodman et al. | |
| 2010/0129196 A1 | 5/2010 | Johnston et al. | |
| 2010/0247284 A1 | 9/2010 | Gregg et al. | |
| 2013/0104567 A1 * | 5/2013 | Konitzer | F01D 5/189 |
| | | | 60/806 |
| 2013/0202409 A1 * | 8/2013 | Jones | F01D 5/189 |
| | | | 415/115 |
| 2013/0243591 A1 * | 9/2013 | Propheter-Hinckley | F01D 5/187 |
| | | | 416/1 |
| 2014/0093379 A1 * | 4/2014 | Tibbott | F01D 5/189 |
| | | | 416/224 |

\* cited by examiner

ENCLOSED BAFFLE FOR A TURBINE ENGINE COMPONENT

CROSS-REFERENCE TO RELATED APPLICATION

This application claims priority to U.S. Provisional Patent Application No. 61/974,688 filed Apr. 3, 2014, which is hereby incorporated herein by reference in its entirety.

STATEMENT REGARDING FEDERALLY SPONSORED RESEARCH OR DEVELOPMENT

This disclosure was made with Government support under FA8650-09-D-2923-0021 awarded by The United States Air Force. The Government has certain rights in this disclosure.

BACKGROUND

The present disclosure relates to a gas turbine engine component and, more particularly, to the cooling of the component having an internal baffle.

Gas turbine engines, such as those that power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases and generate thrust. Downstream of the turbine section, an augmentor section, or "afterburner," is operable to selectively increase the thrust. The increase in thrust is produced when fuel is injected into the core exhaust gases downstream of the turbine section and burned to generate a second combustion.

The turbine section typically includes alternating rows of turbine vanes and turbine blades. The turbine vanes are stationary and function to direct the hot combustion gases that exit the combustor section. Due to the relatively high temperatures of the combustion gases, various cooling techniques are employed to cool the turbine vanes and blades.

The vanes typically include a hollow airfoil with a concave pressure wall and an opposite convex suction wall. Among the various cooling techniques are convection, impingement, film cooling as well as radiation within and through the airfoil walls. Improvements in cooling effectiveness is desirable.

SUMMARY

A turbine engine component according to one, non-limiting, embodiment of the present disclosure includes a first wall; a second wall; and a baffle spaced between the first and second walls, wherein the first wall and the baffle define an upstream cooling path therebetween having an upstream end portion and a downstream end portion, the second wall and the baffle define a downstream cooling path therebetween, and the baffle has a bleed aperture in fluid communication with and between the downstream end portion of the upstream cooling path and the downstream cooling path.

Additionally to the foregoing embodiment, respective cooling holes communicate through the first and second walls.

In the alternative or additionally thereto, in the foregoing embodiment, the baffle defines an internal cavity, and includes a first side defining in-part a boundary of the upstream cooling path and an opposite second side defining in-part a boundary of the downstream cooling path with at least one hole communicating through the second side.

In the alternative or additionally thereto, in the foregoing embodiment, the cavity is completely enclosed except for the bleed aperture and the at least one hole in the second side.

In the alternative or additionally thereto, in the foregoing embodiment, the bleed aperture is in the first side and is in direct fluid communication with and between the downstream end portion of the upstream cooling path and the cavity.

In the alternative or additionally thereto, in the foregoing embodiment, the bleed aperture is in the first side and is in direct fluid communication with and between the downstream end portion of the upstream cooling path and the cavity, and the at least one hole in the second side is a plurality of impingement holes.

In the alternative or additionally thereto, in the foregoing embodiment, the first and second walls are respectively pressure and suction walls of an airfoil and the bleed aperture is generally downstream of the cooling hole in the pressure wall and upstream of the cooling hole in the suction wall.

In the alternative or additionally thereto, in the foregoing embodiment, the bleed aperture is upstream of the plurality of impingement holes.

In the alternative or additionally thereto, in the foregoing embodiment, the baffle includes a cover plate spaced from the first wall and in contact with the second wall.

In the alternative or additionally thereto, in the foregoing embodiment, the baffle includes an end plate in contact with at least one of the first and second walls, and wherein the first and second sides extend between the cover and end plates.

In the alternative or additionally thereto, in the foregoing embodiment, the turbine engine component includes a trip strip in the upstream cooling passage and engaged to the first wall.

In the alternative or additionally thereto, in the foregoing embodiment, the turbine engine component includes a plurality of trip strips engaged to the first wall in the upstream cooling passage.

In the alternative or additionally thereto, in the foregoing embodiment, the component includes a standoff projecting outward from the first wall, contacts the baffle, and is located between and defines in part the upstream and downstream cooling paths.

In the alternative or additionally thereto, in the foregoing embodiment, the component is a vane, the first and second walls are, respectively, pressure and suction walls that join at leading and trailing edges of the vane, and cooling holes in the leading and trailing edges are in direct fluid communication with the downstream cooling path.

A baffle for a turbine engine component according to another, non-limiting embodiment of the present disclosure includes a cover plate including a first edge and an opposite second edge; a first side projecting outward from the cover plate proximate to the first edge; and a second side projecting outward from the cover plate, wherein the first and second sides and the cover plate define at least part of a cavity, and the first side has a bleed aperture in fluid communication with the cavity.

Additionally to the foregoing embodiment, a plurality of impingement holes communicate through the second side and are in fluid communication with the cavity.

In the alternative or additionally thereto, in the foregoing embodiment, the second side is spaced from the second edge.

In the alternative or additionally thereto, in the foregoing embodiment, the baffle includes an end plate defining in-part a boundary of the cavity, and the first and second sides extend between the cover plate and the end plate.

In the alternative or additionally thereto, in the foregoing embodiment, the cavity is completely enclosed except for the bleed aperture and the plurality of impingement holes.

In the alternative or additionally thereto, in the foregoing embodiment, a plurality of impingement holes communicate through the second side and are in fluid communication with the cavity, and the cavity is completely enclosed except by the bleed aperture and the plurality of impingement holes.

The foregoing features and elements may be combined in various combination without exclusivity, unless expressly indicated otherwise. These features and elements as well as the operation thereof will become more apparent in light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
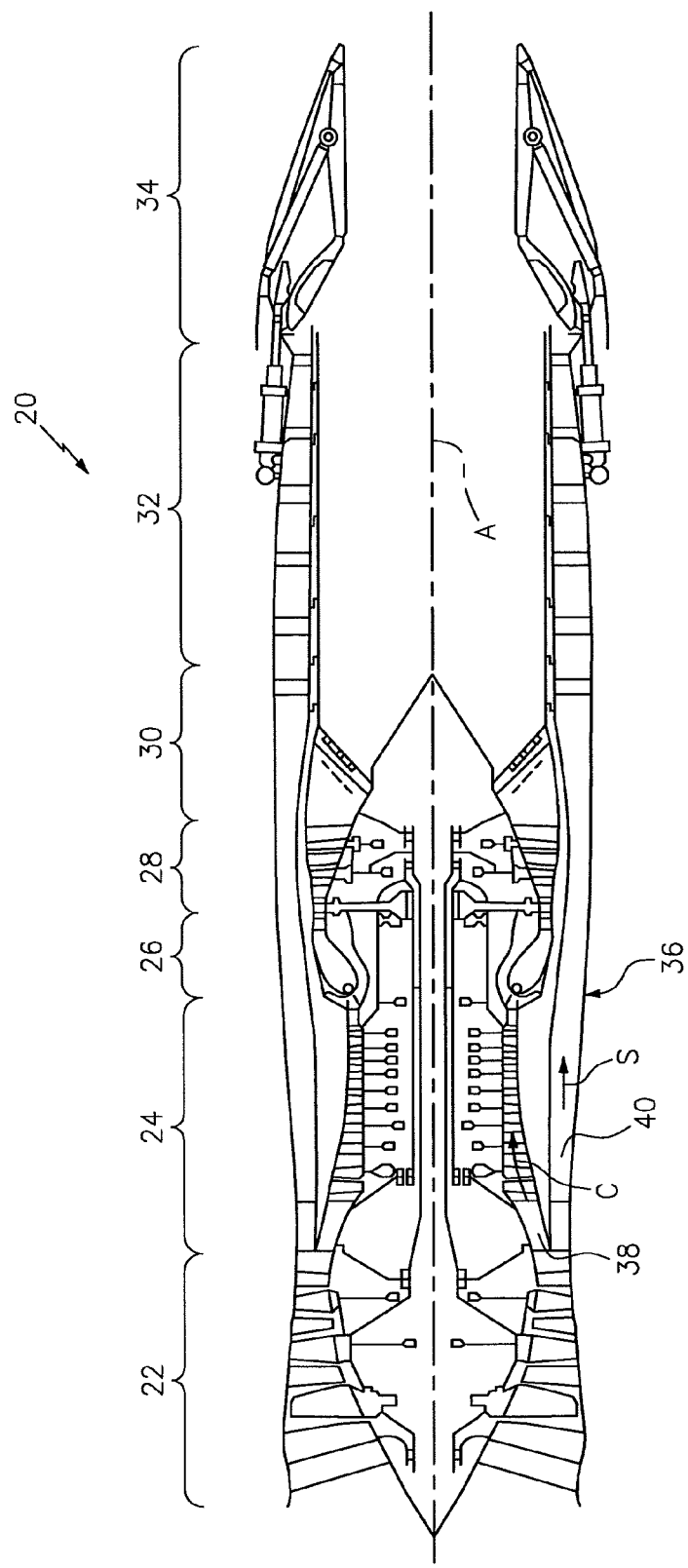
FIG. 1 is a schematic cross section of a gas turbine engine.

Referring to FIG. 1, a gas turbine engine 20 is disclosed as a two-spool low-bypass augmented turbofan that generally incorporates a fan section 22, a compressor section 24, a combustor section 26, a turbine section 28, an augmenter section 30, an exhaust duct 32, and a nozzle system 34 along a central engine axis A. Although depicted as an augmented low bypass turbofan in the disclosed, non-limiting, embodiment, it is understood that the concepts of the present disclosure are applicable to other gas turbine engines including non-augmented engines, geared architecture engines, land-based turbine engines, direct-drive turbofans, turboshaft, multi-stream variable cycle adaptive engines and other engine architectures. Variable cycle gas turbine engines power aircraft over a range of operating conditions and essentially alters a bypass ratio during flight to achieve countervailing objectives such as high specific thrust for high-energy maneuvers yet optimizes fuel efficiency for cruise and loiter operational modes.

As illustrated, the fan section 22 is a multi-staged fan section that may generally function as a low pressure compressor and the compressor section 24 generally functions as a high pressure compressor. In alternative designs such as a high bypass ratio engine (not shown), the fan section may be single staged followed by a compressor section that has both low and high pressure stages. In the present illustration, airflow into the engine 20 may generally be produced by the fan section 22, then divided between a core airflow C and a secondary airflow S. An engine case structure 36 generally functions as an exoskeleton to support rotational hardware of the engine and define, at least in-part, a core airflow path 38 for routing of the core airflow C and at least one secondary airflow path 40 for routing of the secondary airflow S.

The core airflow C enters the compressor section 24 at a low pressure produced by the multi-staged fan section 22 and exits at a high pressure. The high pressure core airflow C then passes through the combustor section 26, the turbine section 28, then the augmentor section 30 where fuel may be selectively injected and burned to generate additional thrust through the nozzle system 34. The secondary airflow S may be generally sourced from the multi-staged fan section 22 at the low pressure and may be utilized for a variety of purposes including, for example, cooling and pressurization, and ultimately, at least partially, injected into the core airflow path 38 adjacent to the exhaust duct section 32 and the nozzle system 34. It is contemplated and understood that the secondary airflow S may be any airflow that is not the core airflow C, and additional airflow streams typical of variable cycle engine architectures (for example) may be provided as part of the secondary airflow S.

The exhaust duct section 32 may be circular in cross section as typical of an axisymmetric augmented low bypass turbofan, or may be non-axisymmetric in cross section to include, but not limited to, a serpentine shape to block direct view to the turbine section 28. In addition to the various cross sections and the various longitudinal shapes, the exhaust duct section 32 terminates with the nozzle system 34 such as a Convergent/Divergent (C/D) nozzle system, an non-axisymmetric two-dimensional (2D) C/D vectorable nozzle system, a flattened slot nozzle of high aspect ratio or other nozzle arrangement.

Figure 2:
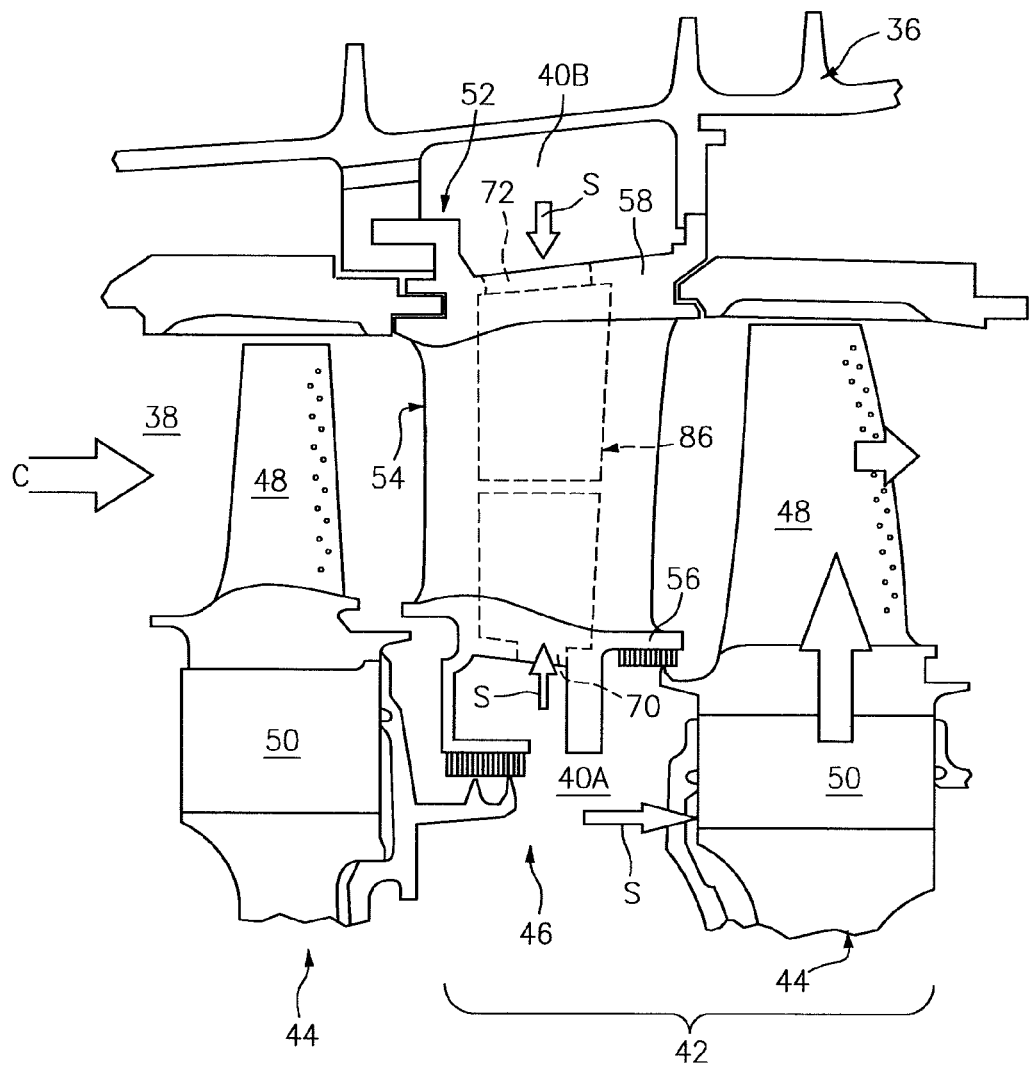
FIG. 2 is partial sectional view of a turbine section of the engine according to one, non-limiting embodiment of the present disclosure.

Referring to FIG. 2, the turbine section 28 may include a plurality of stages 42 each having a forward, stationary, vane ring 46 (best shown in FIG. 3) and an aft, rotating, blade ring 44 generally in the core airflow path 38. As illustrated, one complete stage is shown along with a blade ring 44 of an adjacent and upstream stage. Each blade ring 44 has a plurality of blades 48 spaced circumferentially from one-another and projecting radially outward from, and engaged to, a rotor 50 centered to the engine axis A (FIG. 1). Each vane ring 46 has a plurality of vanes 52 distributed circumferentially about the engine axis A and spanning radially to redirect core airflow C received from the upstream blades. It is appreciated that any number of stages will benefit from the present disclosure, and although illustrated as a high pressure turbine, the teachings may be applied to other sections such as a low pressure turbine, power or industrial gas turbines, intermediate pressure turbines as well as other cooled airfoils such as combustor vanes and any number of stages.

Figure 3:
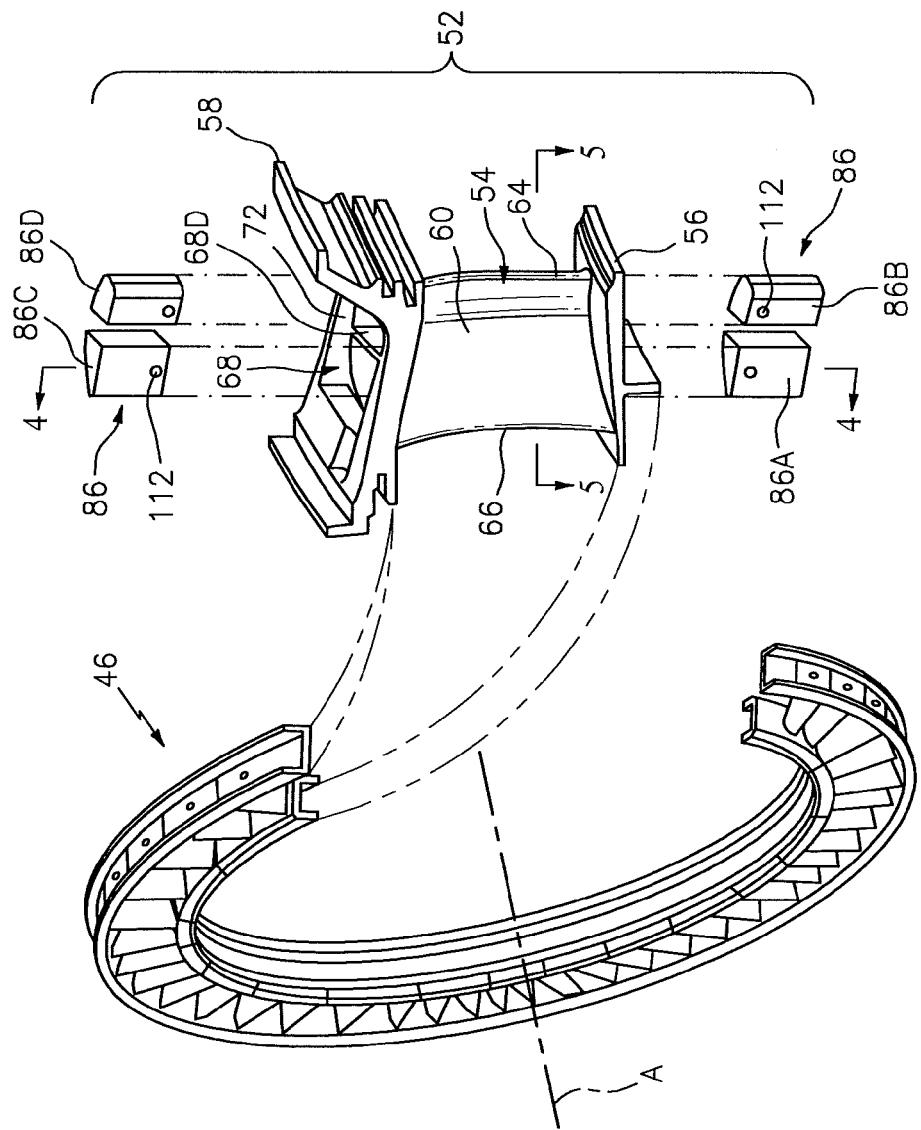
FIG. 3 is a partial exploded view of a vane ring of one turbine stage within the turbine section of the engine.

Referring to FIGS. 2 and 3, each vane 52 of the vane ring 46 includes a hollow airfoil 54 spaced circumferentially from the next adjacent airfoil 54 and extending radially between and engaged to arcuate inner and outer platforms 56, 58. The airfoil 54 and platforms 56, 58 may be manufactured or cast as one unitary piece. Each inner and outer platform 56, 58 is assembled next to the circumferentially adjacent, respective, inner and outer platform 56, 58 thereby forming respective inner and outer annular rings. Although not illustrated and for purposes of manufacture, assembly, maintenance and thermal loads during engine operation, the vane ring 46 may be divided into segments, each segment having any number of vanes projecting between single inner and outer platforms 56, 58. Each segment is thus one unitary piece that may be assembled circumferentially adjacent to the next segment, thereby forming the complete vane ring 46. It is also appreciated that the entire vane ring 46 may be formed as one unitary piece.

The inner and outer platforms 56, 58 of each vane 52 and the engine case structure 36 may define respective secondary airflow paths 40A, 40B with path 40A generally located radially inward of the vane ring 46, and path 40B generally located radially outward of vane ring 46. The core airflow path 38 is defined in-part between the annular rings formed by the respective inner and outer platforms 56, 58.

Figure 4:
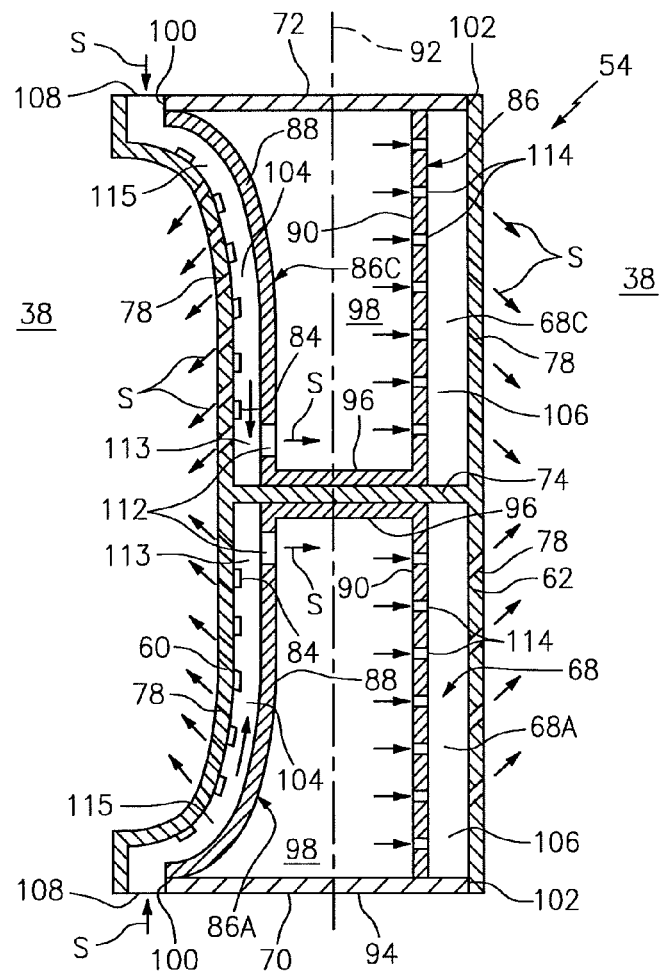
FIG. 4 is a cross section of an airfoil of a vane taken along line 4-4 of FIG. 3.
Figure 5:
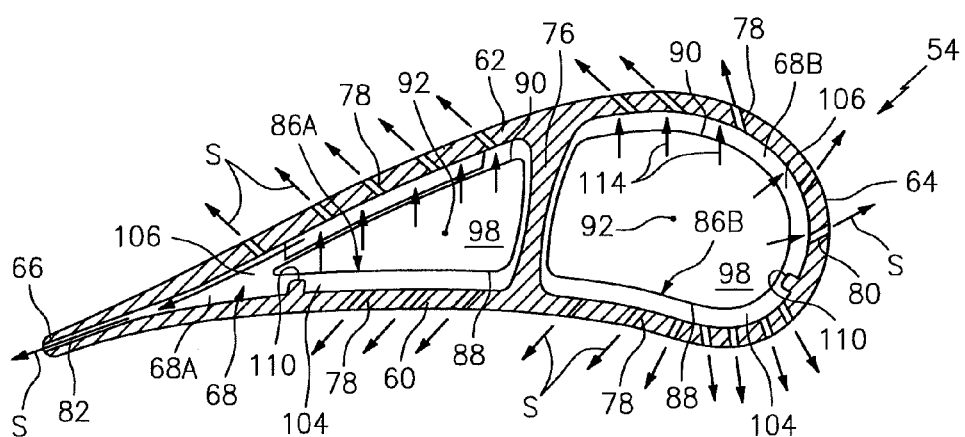
FIG. 5 is a cross section of the airfoil taken along line 5-5 of FIG. 3.

Referring to FIGS. 3 through 5, each hollow airfoil 54 of the vane 52 has pressure and suction walls 60, 62 projecting radially with respect to the engine axis A, and engaged to, the inner and outer platforms 56, 58. Each wall 60, 62 spans circumferentially and axially between, and join to one-another at, leading and trailing edges 64, 66 of the airfoil 54. With regard to outer surfaces of the airfoil 54, the pressure wall 60 is generally concave, and the suction wall 62 is generally convex. A chamber 68 in the vane 52 is defined by the walls 60, 62 and platforms 56, 58. Each inner and outer platform 56, 58 may further have at least one respective inner and outer opening 70, 72 in fluid communication between respective inner and outer secondary airflow paths 40A, 40B and the chamber 68.

The airfoil 54 may further have internal dividing walls 74, 76 (FIGS. 4 and 5) that generally intersect one-another, provide structural support and rigidity to the airfoil, and generally divide and segregate the chamber 68 into four portions 68A, 68B, 68C, 68D. The first dividing wall 74 may generally be spaced radially between the inner and outer platforms 56, 58, and spans between and engages to the pressure and suction walls 60, 62. The second dividing wall 76 may be spaced between the pressure and suction walls 60, 62 and spans radially between and engages to the inner and outer platforms 56, 58. Chamber portions 68A, 68B may be located radially inward from the circumferential dividing wall 74 and are in fluid communication with the inner secondary airflow path 40A through respective inner openings 70. Similarly, portions 68C, 68D may be located radially outward from the dividing wall 74 and are in fluid communication with the outer secondary airflow path 40B through respective outer openings 72. Chamber portions 68A, 68C are isolated from chamber portions 68B, 68D by radially spanning dividing wall 76.

The pressure and suction walls 60, 62 of the airfoil 54 each have a plurality of film cooling holes 78 in fluid communication with and between the chamber 68 and the core airflow path 38 for cooling exterior surfaces of the vane 52 using the secondary airflow S. Similarly, cooling holes 80, 82 of the airfoil 54 communicate through respective leading and trailing edges 64, 66 of the airfoil 54. The pressure wall 60 has a plurality of trip strips 84 projecting into the chamber 68 to provide enhanced heat transfer on the pressure wall 60. It is further contemplated and understood that the term 'cooling hole' may include any number of configurations including apertures and minicores.

Continuing with reference to FIGS. 3 through 5, each vane 52 further includes at least one baffle 86 located in at least one chamber 68 of the airfoil 54. More specifically, baffle 86 may include baffles 86A, 86B, 86C, 86D located in respective chamber portions 68A, 68B, 68C, 68D. Each baffle 86 has opposite sides 88, 90 (FIG. 4) that together surround a longitudinal centerline 92, a cover plate 94 and an end plate 96, all generally defining an internal cavity 98. The centerline 92 may be substantially normal to the plates 94, 96 and may generally intersect the engine axis A. The cover plate 94 has opposite peripheral first and second edges 100, 102 that connect at respective opposite ends to generally define a portion of an outer periphery of the plate 94. The first side 88 spans longitudinally between and is engaged to the end plate 96 and the first edge 100 of the cover plate 94. The second side 90 spans longitudinally between, and is engaged to, the end plate 96 and the cover plate 94 slightly inward of the second edge 102.

The first side 88 is spaced from the pressure wall 60 such that an upstream cooling path 104 is defined between the first side 88 and the pressure wall 60 of the airfoil 54. The second side 90 is spaced from the suction wall 62 such that a downstream cooling path 106 is defined between the second side 90 and the suction wall 62. The first edge 100 is thus spaced from the pressure wall 60 defining an inlet 108 of the upstream cooling path 104 generally between the pressure wall 60 and the first edge 100 of the cover plate 94. The second edge 102 may be in contact with the suction wall 62, thus limiting the only outlet of the downstream cooling path 106 to the film holes 78 in the suction wall 62.

The upstream and downstream cooling paths 104, 106 are laterally isolated from one-another (with respect to longitudinal centerline 92) by a longitudinally extending standoff 110 (FIG. 5) in each chamber portion 68A, 68B, 68C, 68D, and further isolated by contact of at least one of the sides 88, 90 to the dividing wall 76 of the airfoil 54. Each standoff 110 may project laterally outward from the pressure wall 60 of the airfoil 54 and contact a respective baffle 86A, 86B, 86C, 86D. Therefore, the upstream and downstream cooling paths 104, 106 are defined between, and laterally by, the standoff 110 and contact of at least one of the sides 88, 90 to the dividing wall 76. The upstream and downstream cooling paths 104, 106 are longitudinally isolated from one-another (i.e. the paths do not directly communicate with one-another) by contact of end plate 96 and/or one or both of the distal ends of the sides 88, 90 to the dividing wall 74 of the airfoil 54.

A bleed aperture 112 (FIG. 4) in the first side 88 of the baffle 86 is in direct fluid communication with and between downstream end portion 113 of the upstream cooling path 104 and the cavity 98 of the baffle 86. A plurality of impingement holes 114 are distributed across the second side 90 and are each in direct fluid communication with and between the cavity 98 and the downstream cooling path 106. Thus the cavity 98 of each baffle may be completely enclosed except for the baffle's respective bleed aperture 112 and impingement holes 114. It is contemplated and understood that the bleed aperture 112 may be a hole, a gap, a slot or other shapes that allow the controlled passage of cooling air.

During assembly of the vane 52, each inner and outer openings 70, 72 are generally large enough to accept insertion of the respective baffles 86A, 86B, 86C, 86D into the respective chamber portions 68A, 68B, 68C, 68D and until the cover plates 94 are in or generally flush with the respective openings 70, 72 and the end plate 96 contacts the dividing wall 74 of the airfoil 54.

In operation, cooling air (i.e. secondary airflow S) may only enter the chamber 68 of the airfoil 54 through the inlet 108 and thus initially into a upstream end portion 115 of the upstream flow path 104 (see FIG. 4). The cooling air then travels across the trip strips 84 and a portion of air exits the upstream flow path 104 through the film cooling holes 78 in the pressure wall 60 of the airfoil 54. About all of the remaining cooling air, may then flow through the downstream end portion 113 of the upstream flow path 104, through the bleed aperture 112 of the baffle 86, and into the cavity 98. From the cavity 98, about all of the cooling air in the cavity may then be distributed through the impingement holes 114 of the baffle 86 and into the downstream cooling path 106. From the downstream cooling path 106 about all of the remaining cooling air may then flow through the film holes 78 in the suction wall 62, the cooling holes or apertures 82 in the trailing edge 66 and the cooling or film holes 80 in the leading edge 64. It is contemplated and understood that the cooling holes 82 may be film holes, cast-in slots or other types of apertures for the flow of cooling air.

The pressure side cooling path 104 requires high heat transfer with minimal pressure loss in order to reduce backflow margin concerns across the pressure side cooling holes 78 while the suction side cooling path 106 may require high heat transfer with maximum pressure loss in order to reduce bulging of the suction wall 62. The cooling flow arrangements of the present disclosure provide desired heat transfer with minimal pressure loss in the pressure side cooling path 104 and maximum pressure drop across the impingement holes 114. That is, the present disclosure combines low loss trip strips 110 on the pressure wall side with high loss impingement holes on the suction wall side to satisfy metal temperature requirements, pressure side wall backflow margins, and suction side wall bulge requirements. In addition, this cooling flow arrangement uses the suction side cooling flow to cool both the pressure and suction walls 60, 62 respectively, which reduces the overall cooling flow that may be required to satisfy metal temperature requirements.

It is further contemplated and understood that any number of baffles 86 (e.g. one or two) may be applied and satisfy the teachings of the present disclosure. For instance, the airfoil 54 may not have the dividing wall 76. In such an example, only two baffles may be utilized in a single airfoil and not necessarily the four baffles illustrated. Yet further, in airfoils having no dividing walls, a single baffle may be used in a single airfoil. The teaching of the present disclosure may also apply to blades that require cooling. In such blade cooling applications, the blade may be manufactured with the baffle as one unitary piece using (for example) an additive manufacturing process. Even further, the vane 52 may, instead, be any number of turbine engine components, such as, for example, a blade outer air seal (BOAS) that generally have opposing walls that may require cooling and a baffle located therebetween.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A turbine engine component comprising:
    a first component wall;
    a second component wall; and
    a baffle spaced between the first and second component walls, wherein the first component wall and a first baffle wall of the baffle define an upstream cooling path therebetween having an upstream end portion and a downstream end portion, wherein the second component wall and a second baffle wall of the baffle define a downstream cooling path therebetween, wherein the first baffle wall at least in-part defines a bleed aperture at the downstream end portion, wherein the second baffle wall includes at least one hole that communicates from a baffle cavity to the downstream cooling path, wherein the first and second baffle walls at least partially define the baffle cavity, and wherein the baffle cavity is completely enclosed except for the bleed aperture in the first baffle wall and the at least one hole in the second baffle wall.

2. The turbine engine component set forth in claim 1, wherein respective cooling holes communicate through the first and second component walls.

3. The turbine engine component set forth in claim 1, wherein the bleed aperture is in direct fluid communication with and between the downstream end portion of the upstream cooling path and the baffle cavity.

4. The turbine engine component set forth in claim 1, wherein the bleed aperture is in direct fluid communication with and between the downstream end portion of the upstream cooling path and the baffle cavity, and the at least one hole in the second baffle wall is a plurality of impingement holes.

5. The turbine engine component set forth in claim 2, wherein the first and second component walls are respectively pressure and suction walls of an airfoil and the bleed aperture is generally downstream of the cooling hole in the pressure wall and upstream of the cooling hole in the suction wall.

6. The turbine engine component set forth in claim 4, wherein the bleed aperture is upstream of the plurality of impingement holes.

7. The turbine engine component set forth in claim 1, wherein the baffle includes a cover plate spaced from the first component wall and in contact with the second component wall.

8. The turbine engine component set forth in claim 7, wherein the baffle includes an end plate in contact with at least one of the first and second component walls, and wherein the first and second baffle walls extend between the cover and end plates.

9. The turbine engine component set forth in claim 1 further comprising:
    a trip strip in the upstream cooling passage and engaged to the first component wall.

10. The turbine engine component set forth in claim 4 further comprising:
    a plurality of trip strips engaged to the first component wall in the upstream cooling passage.

11. The turbine engine component set forth in claim 3 further comprising:

a standoff projecting outward from the first component wall, contacting the baffle, and located between and defining in-part the upstream and downstream cooling paths.

12. The turbine engine component set forth in claim 11, wherein the component is a vane, the first and second component walls are, respectively, pressure and suction walls of the vane, the pressure and suction walls join at leading and trailing edges of the vane.

13. The turbine engine component set forth in claim 1, further comprising:
a second baffle spaced between the first and second component walls, wherein the first component wall and a first baffle wall of the second baffle define a second upstream cooling path therebetween having a second upstream end portion and a second downstream end portion, the second component wall and a second baffle wall of the second baffle define a second downstream cooling path therebetween, and the first baffle wall of the second baffle at least in-part defines a second bleed aperture at the second downstream end portion.

14. The turbine engine component set forth in claim 1, wherein the baffle includes an end plate and a cover plate, wherein the cover plate has opposite first and second edges, wherein the first baffle wall spans longitudinally between and is engaged to the end plate and the first edge of the cover plate, and wherein the second baffle wall spans longitudinally between and is engaged to the end plate and the cover plate inward of the second edge.

15. The turbine engine component set forth in claim 14, wherein the first edge is spaced from the first component wall to define an inlet of the upstream cooling path between the first component wall and the first edge.

16. The turbine engine component set forth in claim 15, wherein air enters through the inlet and travels longitudinally along the first component wall from the upstream end portion to the downstream end portion before entering the baffle cavity via the bleed aperture to cool the first component wall.

17. The turbine engine component set forth in claim 16, wherein the air exits the baffle cavity via the at least one hole in the second baffle wall to cool the second component wall via impingement.

* * * * *